United States Patent [19]

Kenmostu et al.

[11] Patent Number: 4,536,865
[45] Date of Patent: Aug. 20, 1985

[54] BOOKSHELF TYPE RECORD PLAYER

[75] Inventors: Isami Kenmostu; Nobuyuki Isobe, both of Saitama, Japan

[73] Assignee: Pioneer Electronic Corporation, Tokyo, Japan

[21] Appl. No.: 557,396

[22] Filed: Dec. 2, 1983

Related U.S. Application Data

[63] Continuation of Ser. No. 250,330, Apr. 2, 1981, abandoned.

[30] Foreign Application Priority Data

Apr. 4, 1980 [JP] Japan ................................. 55-44241

[51] Int. Cl.³ ........................... G11B 1/00; G11B 3/08
[52] U.S. Cl. ................................. 369/75.2; 369/77.1; 369/263; 369/264; 312/8
[58] Field of Search ................. 312/8; 369/75, 79, 77, 369/263, 264

[56] References Cited

U.S. PATENT DOCUMENTS

| 2,094,246 | 9/1937 | Suomala | 312/8 |
| 2,441,893 | 5/1948 | McKee | 369/79 |
| 2,447,999 | 8/1948 | Kalff et al. | 369/75 |
| 2,475,744 | 7/1949 | Harman | 369/79 |
| 2,608,456 | 8/1952 | Barth | 312/8 |
| 2,642,327 | 6/1953 | Swanson | 312/8 |
| 2,712,942 | 7/1955 | Smits | 369/77 |

FOREIGN PATENT DOCUMENTS

| 615993 | 1/1949 | United Kingdom . |
| 839576 | 6/1960 | United Kingdom . |
| 944560 | 12/1963 | United Kingdom ................. 369/77 |
| 1456293 | 11/1976 | United Kingdom . |
| 2075242 | 11/1981 | United Kingdom ................. 369/75 |

Primary Examiner—Steven L. Stephan
Attorney, Agent, or Firm—Sughrue, Mion, Zinn, Macpeak & Seas

[57] ABSTRACT

A compact bookshelf type record player having substantially the width as the width of the turntable. A motor slide plate is slidably mounted through a front opening in the player cabinet and slidable between fully retracted, record playing and record changing positions. A tone arm is mounted on the slide plate in such a manner that it can be swung out of the way completely to the rear of the slide plate when not in use. The positions of the slide plate are controlled by operation of a main switch which is of the push-push type with the D.C. motor providing the positioning force.

19 Claims, 16 Drawing Figures

BOOKSHELF TYPE RECORD PLAYER

This application is a continuation of application Ser. No. 250,330, filed Apr. 2, 1981 now abandoned.

BACKGROUND OF THE INVENTION

The present invention relates to a bookshelf type record player in which except when a record is being played, a tone arm is positioned at the rear side of a turntable whereby a space which had to be provided on one side of the tone arm in a conventional record player for resting the tone arm is dispensed with. As result, the width of the player cabinet can be considerably decreased to substantially the same length as the diameter of the turntable.

In prior art record players, a turntable having a diameter substantially equal to or somewhat greater than the diameter of the largest record disc to be played is disposed on a player board. An arm rest is provided on the right side of the turntable in a tone arm rest space. Accordingly, the overall player cabinet is rather larger than the turntable. Furthermore, in the prior art record players, there is usually provided an upper turntable cover member made of acrylic resin. The overall record player size is approximately 50 cm in each of width, depth and height and hence a relatively large amount of space is required.

An object of the invention is to provide a much more compact record player.

In particular, it is an object of the present invention to provide a recorder player in which a tone arm rest space located on the right side of a prior art turntable is omitted so that the width of the player cabinet is substantially the same as the diameter of the turntable.

SUMMARY OF THE INVENTION

In accordance with this and other objects of the invention, a bookshelf type record player is provided which has a very compact size and with which all operations are carried out through a front opening. A slide plate is slidably mounted in the cabinet and is slidable between retracted, playing and record changing or turntable attaching positions. In the retracted position, the slide plate is fully within the player cabinet. A tone arm is mounted on the slide plate so that it can be swung to the rear of the slide plate when not in use. A turntable is attached to a phonomotor mounted on the slide plate only when the player is in operation. Thus, the width of the player can be reduced to substantially the width of the turntable. A single main push-push operational switch is provided for controlling operations of the player. A D.C. motor is coupled to the cabinet with an operational shaft coupled through a crank mechanism to the slide plate for operatively positioning the slide plate in response to operations of the main switch.

DESCRIPTION OF THE PREFERRED EMBODIMENTS

A preferred embodiment of the present invention will now be described with reference to the accompanying drawings.

Figure 1:
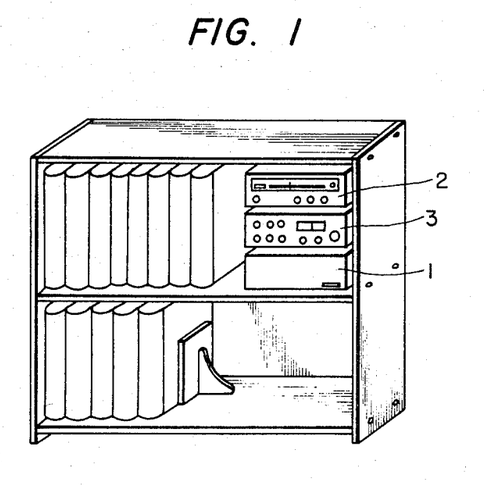
FIG. 1 is a front perspective view showing an installation of a record player of the invention.

FIG. 1 shows a bookshelf type record player 1 having the same size as a tuner 2 and a pre/main amplifier 3, which together can be arranged in a stacked arrangement on a bookshelf. The overall player cabinet is 320 mm wide, 200 mm deep and 98 mm high. The player has substantially the same width and depth as a standard A4 size sheet of 30 cm×21 cm. The player cabinet can be fully received in the bookshelf without parts projecting from the bookshelf, unlike a prior art record changer.

Figure 2:
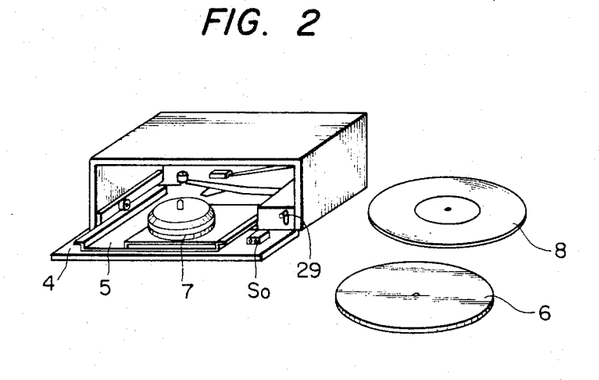
FIG. 2 is a perspective view showing a record player of the invention in an open state.

FIG. 2 is a schematic perspective view of the record player showing a state where a front cover 4 is opened and a motor slide plate 5 is slidably moved from a retracted position to a projecting position in which the turntable can be attached or removed. The turntable 6, which is attached only in the play mode is set on a motor shaft of a phonomotor 7 affixed to the motor slide plate 5. In the non-play mode, the turntable is removed from the record player so that the motor slide plate 5 can be received in the cabinet. The tone arm is rotated to a position at the rear portion of the player cabinet except for the play mode. Also, as a record disc is being placed on the turntable, the tone arm is still positioned to the rear side of the turntable. Thus, according to the present invention, the depth of the player cabinet can be made shorter than a 30 cm diameter record disc.

Operations of the motor slide plate of the invention will be explained with reference to FIGS. 3a to 3d.

Figure 3A:
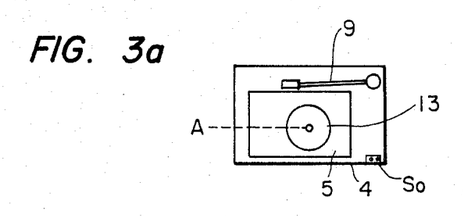
FIGS. 3a–3d are series of top views showing the record player of FIG. 2 in various positions.

All of the operations of the motor slide plate 5 can be controlled by pushing a main switch $S_0$. The operations are continued in order from a retracted or received position (FIG. 3a), through a turntable attachment position (FIGS. 3b and 3c), a play position (FIG. 3d), and a record disc placing position (FIG. 3c), back to the retracted or received position (FIG. 3a).

In the received position (FIG. 3a), the motor slide plate 5 is received in the player cabinet wherein the motor output shaft of the phonomotor 13 is located at a position A and the tone arm 9 is rotated at a position at the rear side of the phonomotor 13.

Figure 3B:
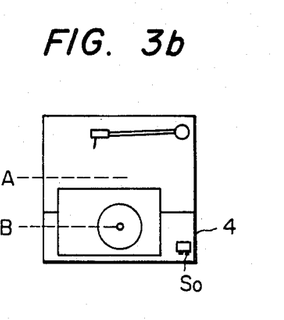
Figure 3C:
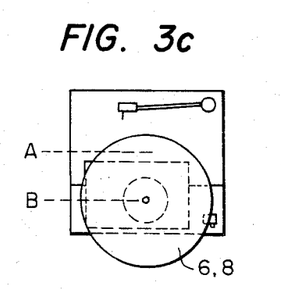
Figure 3D:
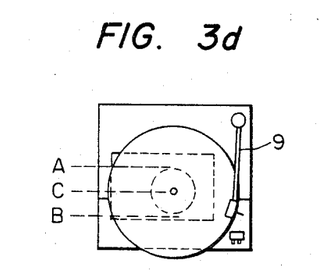

When the front cover 4 is opened and the main switch $S_0$ is pushed, the motor slide plate 5 is moved forwardly and stopped at the turntable attachment position as shown in FIG. 3b. In order to readily achieve the attachment of the turntable 6 and the record disc 8 at this position, the motor shaft of the phonomotor is then located at a position B in front of the player cabinet 8. Under this condition, the turntable 6 is mounted on the phonomotor shaft, the record disc is also placed on the turntable and then the main switch is pushed to turn the player on. Subsequently, the motor slide plate is moved in the reverse direction by a predetermined distance and is stopped at a play position C (FIG. 3d) between the received position A and the turntable attachment position B. Then, the tone arm is rotated forwardly for the play mode of operation.

When play has been finished and the main switch is again pushed, the tone arm is rotated to the rear side of the player cabinet and the motor slide plate is again moved forwardly. Subsequently, the motor slide plate is stopped at the record changing position, which is the same as the turnable attachment position. After the record has been changed, when the main switch $S_0$ is again pushed, the slide plate is moved to the play position C. Thereafter, the above described modes of operations are repeated in the same manner.

In order to receive the slide plate 5 at the retracted position, the turntable is removed as well as the record disc at the record attachment removal position, and the main switch $S_0$ is pushed. As a result, the slide plate is moved directly to the retracted position A.

Figure 4:
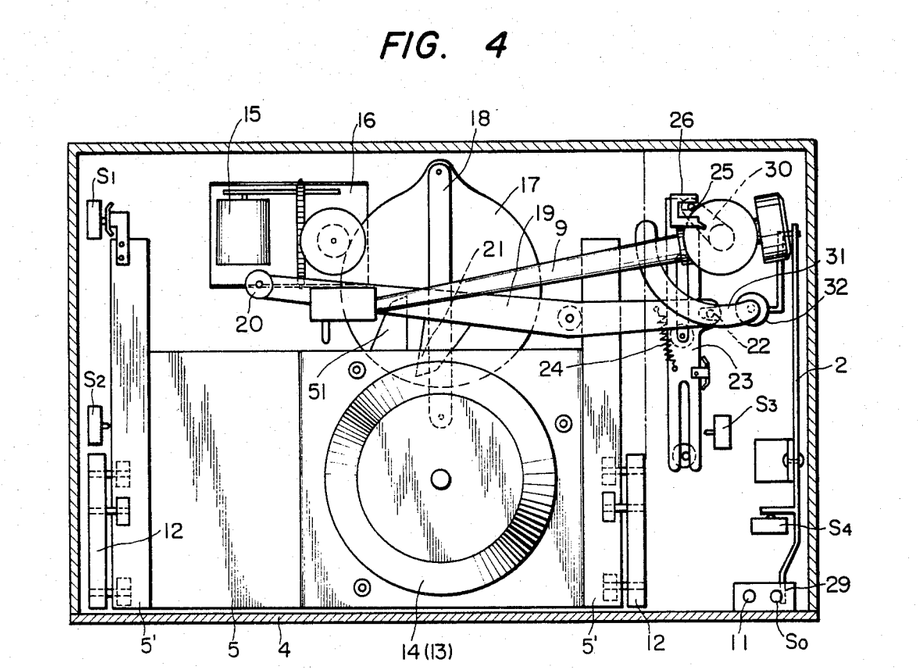
FIG. 4 is a plan view showing details of the construction of the record player of FIG. 2.
Figure 5:
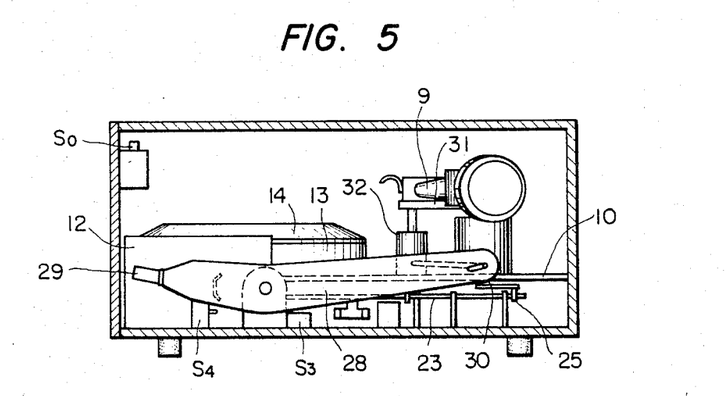
FIG. 5 is a side view of the record player as shown in FIG. 4.

Reference will now be made to FIGS. 4 and 5 showing the inner detailed construction of the player. FIG. 4 is a plan view of the construction from which an upper plate of the player cabinet and a tone arm mounting plate have been removed. FIG. 5 is a side view of the construction.

In the embodiment shown, the front cover is rotatably mounted at an end of a bottom plate of the player cabinet, and a speed selection knob 11 and the main switch are mounted on an upper end portion of the front cover 4.

The motor slide plate 5 is provided with a pair of slide portions 5' at both side ends and is supported by a plurality of rollers mounted on both support members 12 fixedly secured to the bottom plate of the player cabinet so that the motor slide plate can be moved forwardly and backwardly.

A phonomotor 13 of the direct drive type is mounted on the motor slide plate 5. A small diameter turntable 14 is fixedly secured to an upper portion of the motor shaft with the main turntable 6 being adapted to be positioned thereon. The main turntable 6 is made of aluminum, high density plastic, glass or the like.

A D.C. motor 15 for driving the motor slide plate 5 is mounted on the bottom plate of the player cabinet and is coupled to the motor slide plate 5 through a reduction device 16, a gear 17 and a crank mechanism 18.

Limit switches $S_1$ and $S_2$ are mounted on the bottom plate of the player cabinet close to the locus of the motor slide plate. These are actuated by an actuating strip provided at a rear end of the slide portion of the motor slide plate for detecting the retracted or received position and the turntable attachment/removal position (record disc changing position) of the motor slide plate.

Figure 9:
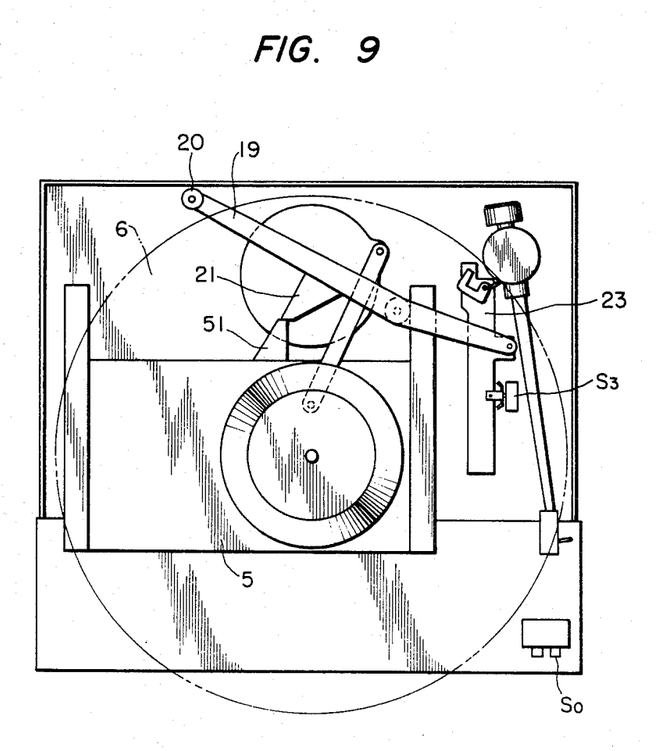
Figure 10:
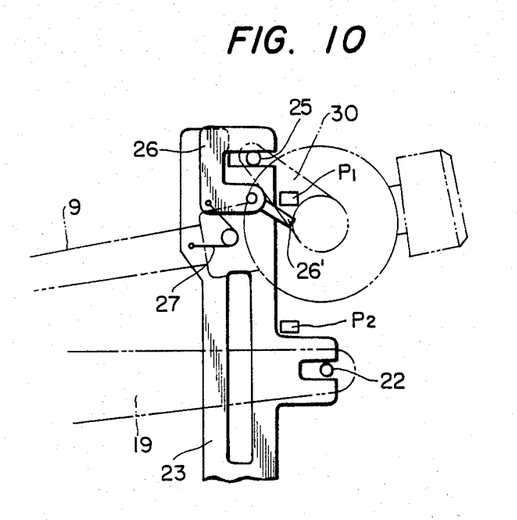
FIGS. 10–12 are a series of plan views showing the details of construction of a slide lever and associated components utilized in the record player of FIG. 4.

A setting lever 19 is located on the rear side of the motor slide plate on the bottom plate of the player cabinet and is rotatably supported thereon. A roller 20 which contacts the turntable 6 is provided at an end of the setting lever. A locking projection 21 is provided at an intermediate portion of the setting lever with the locking projection 21 abutting against an actuating projection 51 of the motor slide plate 5, as best seen in FIG. 9, when the setting lever is rotated into abutment with the turntable. The setting lever 19 is rotatably coupled at the other end to a slide lever 23 by an engaging pin 22, as best seen in FIG. 10.

Figure 12:
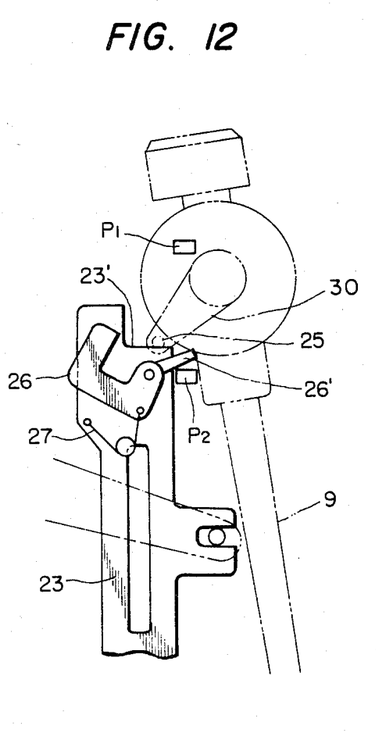

The slide lever 23 is biased to normally move rearwardly by a spring 24 one end of which is secured to the bottom plate of the player cabinet. Upon clockwise rotation of the setting lever 19, the slide lever 23 is moved forwardly. After the tone arm 9 is moved above the upper surface of the record disc, a limit switch $S_3$ is actuated as shown in FIG. 9. A cutaway portion 23' is formed at a rear end of the slide lever 23 as shown in FIG. 12. A U-shaped click member 26 which selectively engages with a tone arm rotating pin 25 is pivotally provided at the end of the slide lever 23 confronting the cutaway portion 23'. The U-shaped click member 26 is, as shown in FIG. 10, biased in a click manner between two positions by a spring 27. The U-shaped member 26 is rotated by the abutment against stops $P_1$ and $P_2$ secured to the cabinet bottom plate when the slide lever 23 is moved.

Figure 11:
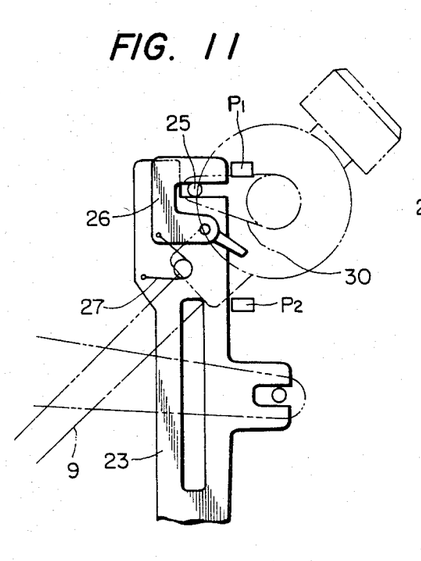

The tone arm rotating pin 25 is secured to an end of a tone arm rotating arm 30 which is secured to a vertical shaft of the tone arm 9. The tone arm rotating pin is selectively engaged with the U-shaped click member 26 of the slide lever 23 as shown in FIGS. 10 to 12.

A tone arm elevation lever 28 is movable up and down at a position on the right side of the player cabinet. An actuating end portion of the arm elevation lever 28 extends to an operational portion 29 (FIG. 4). An arm lifter 32 having an arcuate arm supporting member 31 is provided close to the vertical shaft of the tone arm 9 and is suitably connected to the arm elevation lever 28.

A limit switch $S_4$ is provided in the vicinity of the arm elevation lever 28. When the arm elevation lever 28 is rotated counterclockwise in FIG. 5 with the tone arm 9 lowered, the limit switch $S_4$ is actuated by the arm elevation lever 28.

Figure 6:
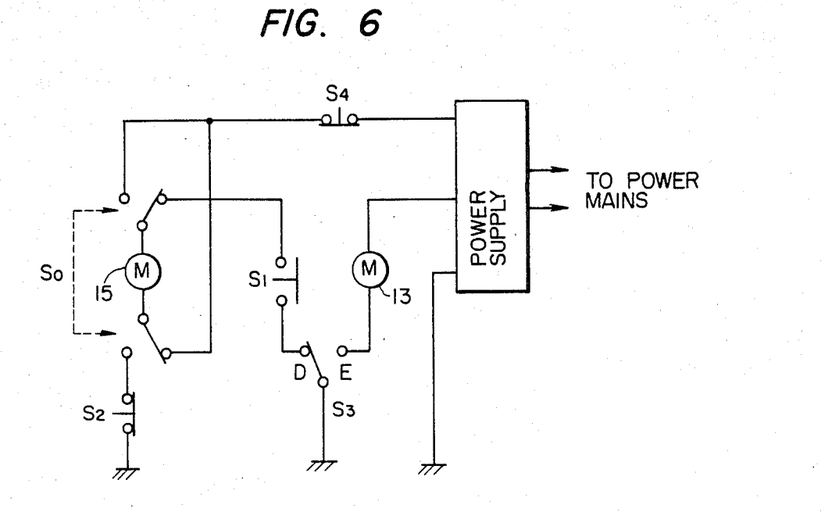
FIG. 6 is a schematic electrical diagram of a circuit utilized in the record player of FIG. 4.

Reference will now be made to FIG. 6 showing a circuit of the D.C. motor 15 and the phonomotor 13 for actuating the main switch $S_0$, limit switches $S_1$ to $S_4$ and motor slide plate 5. In the circuit shown, the respective switches are shown in their positions when the motor slide plate 5 is in the received portion as shown in FIG. 4.

The main switch is a so-called push-push type. With this switch, every time it is pushed, the direction of current supplied to the D.C. motor 15 is reversed to thereby vary the rotational direction thereof. The limit switches are of the on-off type which open when operated but are normally closed. When the motor slide plate 5 is at the retracted position, the limit switch $S_1$ is actuated by the actuating strip formed on the slide portion 5' to therefore be opened (FIG. 4). The limit switch $S_3$ normally makes contact with terminal D except when it is actuated by the slide lever 23, in which case it makes contact with terminal E.

The operation of the apparatus will now be described.

(I) Received Position to Turntable Attachment Position

When the motor slide plate 5 is received in the cabinet, the main switch $S_0$ and the limit switches $S_1$ to $S_2$ are at positions shown in FIG. 6 and the D.C. motor 15 and the phonomotor 13 are stopped.

When the main switch $S_0$ is depressed, two movable contacts thereof are moved leftwardly (in FIG. 6) and the D.C. motor 13 is then rotated in one direction which will be referred to as the "positive direction". At the same time the gear 17 is rotated clockwise to thereby allow the motor slide plate 5 to move forwardly, while the actuating strip is separated from the limit switch $S_1$ so that the switch $S_1$ is closed.

Figure 7:
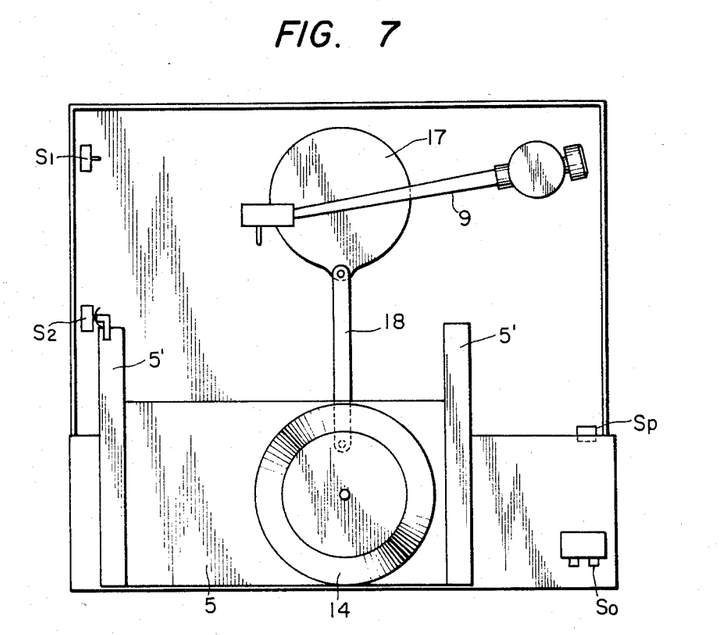
FIGS. 7–9 are a series of top views showing portions of the mechanism of FIG. 4 in various operating states.

When the motor slide plate 5 is moved to the turntable attachment position, the actuating strip of the motor slide plate opens the limit switch $S_2$ to thereby stop the D.C. motor 15 (FIG. 7).

(II) Turntable Attachment Position to Play Position

The main turntable 6 is set on the small diameter table 14 of the phonomotor 13. When the main switch $S_0$ is again depressed, the two movable points are both changed over on the right side in FIG. 6. At this time, since the limit switch $S_1$ is already closed, the D.C. motor 15 is rotated in the opposite direction (negative direction) to thereby cause the motor slide plate 5 to move rearwardly.

Figure 8:
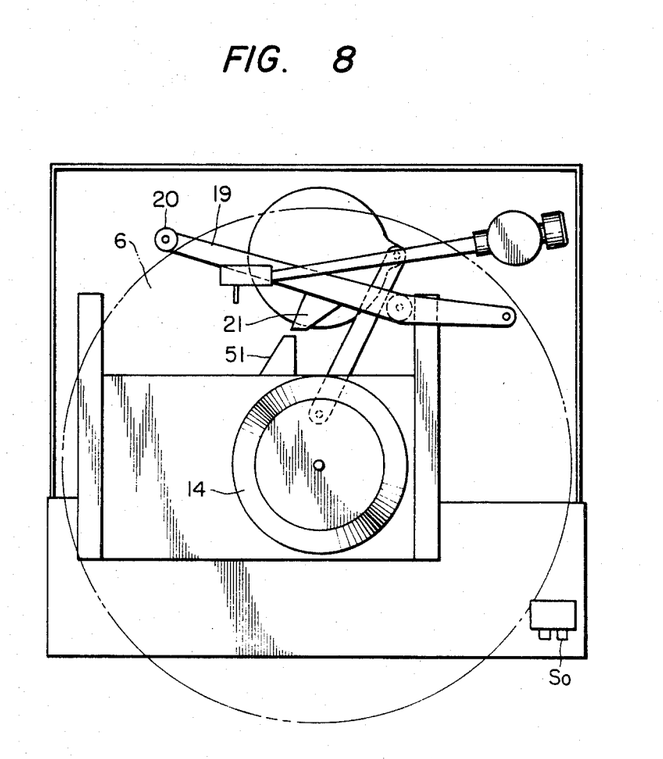

At the midposition, when the outer periphery of the turntable 6 is in abutment with the roller 20 of the setting lever 19 (FIG. 8), the setting lever 19 is rotated clockwise. Subsequently the locking plate 21 of the setting lever 19 comes into abutment with the projection 51 formed at the rear end of the motor slide plate 5 to thereby allow the setting lever to further rotate. As a result, the roller 20 is separated from the turntable 6 (FIG. 9).

By rotation of the setting lever 19, the slide lever 23 is moved forwardly against the force of the spring 24 through the engagement pin 22, and the U-shaped click member 26 of the slide lever 23 is moved while engaging the tone arm rotating pin 25. As a result, the tone arm 9 is rotated above the leading groove of the record disc.

When the slide lever 23 is moved to the play position, the limit switch $S_3$ is actuated so that its movable contact is moved from the terminal D to the terminal E. As a result, the D.C. motor 15 is stopped while the phonomotor 13 rotates.

At this time, the U-shaped click plate 26 abuts against the stop $P_2$ at one end and is rotated counterclockwise to thereby be disengaged from the tone arm rotating pin 25, as illustrated in FIG. 12.

Since the tone arm 9 is stopped on the leading groove of the record disc, by manually lowering the operational portion 29 of the arm elevation lever 28, the tone arm 9 is lowered onto the record disc to start the play operation. Since at this time, the arm elevation lever 28 allows the switch $S_4$ to be open, even if the main switch $S_0$ is erroneously depressed, the motor slide plate 5 will not move and hence the record disc and the pick-up cartridge are protected from misoperation.

(III) Play Position to Record Disc Change Position (Turntable Removal Position)

When play is finished, the arm elevation lever 28 is operated to lift the tone arm 9. Then the main switch $S_0$ is pushed, the D.C. motor 15 is rotated in the positive direction to thereby move the motor slide plate 5 forwardly. The slide lever 23 is moved by action of the spring 24. The setting lever 19 is rotated counterclockwise. The slide lever 23 allows the limit switch $S_3$ to separate therefrom and the movable contact is changed over from the terminal E to the terminal D to thereby stop the phonomotor 13.

The slide lever 23 pushes the tone arm rotating pin 25 at its rear end cutaway portion 23' as shown in FIG. 12 to thereby rotate the tone arm 9 rearwardly. At the same time, the end portion 26' of the U-shaped click plate 26 is rotated in the clockwise direction in abutment with the stop $P_1$. Then, the click plate is again engaged with the tone arm rotating pin 25 as shown in FIG. 10.

When the motor slide plate 5 is moved to the turntable removal position, namely, the record disc changing position, the limit switch $S_2$ is actuated so that the D.C. motor 15 is stopped.

(IV) Record Change Position to Retracted Position

In this condition, when the record discs are changed and the main switch is depressed, the same operation as set forth in (II) above is repeated.

In order to move the motor slide plate 5 to the retracted position, the turntable is removed as well as the record disc and the main switch $S_0$ is depressed. The two movable contacts are changed over to the rightward positions in FIG. 6. As a result, the D.C. motor 15 is rotated in the opposite direction and the slide plate 5 is moved to the retracted position in the player cabinet. Since in this case, there is no turntable present, the roller 20 of the setting lever 19 does not contact against the turntable. Therefore, the limit switch $S_3$ is not operated and the slide plate is moved directly to the retracted position to thereby operate the limit switch $S_1$.

In the above described embodiments, the limit switches $S_1$ and $S_2$ are provided close to the motor slide plate 5. However, the switches can be provided on the periphery of the gear 17 so that the switches are operated by the rotation of the gear 17.

In the above described embodiments, the roller 20 of the setting lever 19 detects whether the turntable is present on the support table or not. However, photoelectric elements can be used so as to further simplify the construction.

It is preferable to provide an electric supply switch in the power supply in a well known manner. The electric supply switch Sp is provided at a suitable hinge portion between the player cabinet and the front cover as shown in FIG. 7.

Figure 13:
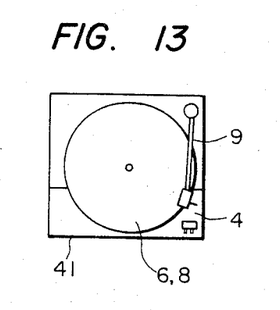
FIG. 13 is a schematical illustration of a modification according to the invention.

FIG. 13 is a schematic illustration showing a modification of the invention, in which the front cover 4 is opened and the turntable 6 and the record disc 8 are set on the record player. In this modification, a frontmost edge 41 of the opened front cover 4 is more projected than a frontmost portion of the set turntable 6 or the record disc 8. With such a construction, an operator's hand is possibly prevented from erroneously contacting with the record or the turntable.

What is claimed is:

1. A bookshelf type record player comprising:
   a player cabinet having a depth dimension smaller than the diameter of a standard record disk;
   a tone arm;
   a turntable;
   means for mounting said tone arm at a position adjacent a rear side of said player cabinet said tone arm being rotatable so as to normally extend substantially parallel to said rear side of said player cabinet when said record player is not in a play mode;
   a turntable support member; and
   means for movably mounting said turntable support member in said cabinet so that said turntable support member is movable between a play position and a record disc changing position, said record disc changing position being located further from said rear side of said player cabinet than said play position, and constituting a turntable attachment removal position,
   said movable mounting means also being capable of moving said turntable support member in said player cabinet between a retracted position and said play position, said play position being located further from said rear side of said cabinet than said retracted position, said turntable being removed from said turntable support member prior to movement of the same to said retracted position.

2. The record player of claim 1 further comprising a crank mechanism for moving said turntable support member.

3. The bookshelf type record player as claimed in claim 1, further comprising means for detecting the presence of said turntable on said turntable support member when said turntable support member is in a play position.

4. A bookshelf type record player comprising:
a player cabinet;
a turntable;
a phonomotor for rotating said turntable;
a turntable support member, said turntable being attachably and removably mountable on said turntable support member;
means for movably mounting said turntable support member in said cabinet so that said turntable support member is movable between a retracted position and a play position, said play position being located further from a rear side of said player cabinet than is said retracted position;
means for detecting the presence of said turntable on said turntable support member when said turntable support member is in a play position, and means for actuating said phonomotor in response to turntable detection.

5. The record player of claim 4 further comprising a crank mechanism for moving said turntable.

6. A bookshelf type record player comprising:
a player cabinet having a depth dimension smaller than the diameter of a standard record disk;
a turntable;
a turntable support member, said turntable being attachably and detachably mounted on said turntable support member;
means for movably mounting said turntable support member in said cabinet between a retracted position, a record disc changing position whereat said turntable may be mounted on said support member or removed therefrom, and a play position, said play position being located between said retracted position and said record disc changing position along a direction extended perpendicular to a rear side of said cabinet; and
means for detecting the presence of said turntable on said turntable support member when said turntable support member is in a play position.

7. The record player of claim 6 further comprising a crank mechanism for moving said turntable support member.

8. The bookshelf type record player of claim 6 further comprising single switch means and another for controlling all movement of said turntable support member.

9. A bookshelf type record player comprising:
a player cabinet;
a turntable support member;
means for movably mounting said turntable support member in said cabinet so as to be movable towards and away from a rear side of said cabinet;
a turntable attachably and detachably mountable on said turntable support member;
means for detecting the presence of said turntable on said turntable support member when said turntable support member is in a play position;
a tone arm;
means for mounting said tone arm at a position adjacent said rear side of said cabinet, said tone arm being rotatable so as to extend substantially parallel to said rear side of said player cabinet when said record player is not in a play mode.

10. A bookshelf type record player comprising:
a player cabinet;
a turntable;
a turntable support member;
means for mounting said turntable support member in said cabinet so as to be movable towards and away from a rear side of said cabinet;
a turntable attachably and detachably mountable on said turntable support member;
means for detecting the presence of said turntable on said turntable support member when said turntable support member is in play position; and
means for rotating said turntable in response to an output of said detecting means.

11. A bookshelf type record player comprising:
(a) a player cabinet;
(b) a turntable support member mounted on said cabinet;
(c) means for moving said turntable support member between a retracted position at a rear side of said cabinet, a record disc changing position and a play position, said play position being further from said rear side than said retracted position and said record disc changing position being further from said rear side than said play position;
(d) a turntable detachable from and attachable to said turntable support member;
(e) a turntable support member moving means control circuit including a first switch adapted to be actuated when said turntable support member is positioned at said retracted position and
a second switch adapted to be actuated when said turntable support member is positioned at said play position, said control circuit controlling movement of said turntable support member such that when said turntable support member is moved rearwardly from said record disc changing position, at least said first switch is actuated whereby movement of said turntable support member is stopped.

12. The bookshelf type record player as claimed in claim 11, further comprising means for detecting whether said turntable is attached to said turntable support member at least when said turntable support member approaches said play position from said record disc changing position, and turntable switch means operable in response to said detecting means for stopping movement of said turntable support means upon detection of said turntable, said control circuit controlling movement of said turntable support means such that said turntable support means moves directly from said record disc changing position to said retracted position when no turntable is detected by said detecting means.

13. A bookshelf type record player comprising:
(a) a player cabinet;
(b) a turntable support member mounted in said cabinet to be movable between a play position and a record disc changing position, said record disc changing position being located further from a rear side of said cabinet than said play position;

(c) a turntable detachable from and attachable to said turntable support member;
(d) a tone arm;
(e) means for mounting said tone arm at a position adjacent said rear side of said cabinet, said tone arm normally being positioned parallel to said rear side of said cabinet when said record player is not in a play mode;
(f) means for detecting the presence of said turntable on said turntable support member; and
(g) means for positioning said tone arm, wherein when said turntable support member is moved from said record disc changing position to said playing position when the presence of the turntable on said turntable support member is detected by said detecting means, said tone arm is rotated to a position above said turntable.

14. A bookshelf type record player comprising:
(a) a player cabinet;
(b) a turntable support member mounted in said cabinet to be movable between a play position and a record disc changing position, said record disc changing position being located further from a rear side of said cabinet than said play position;
(c) a turntable detachable from and attachable to said turntable support member;
(d) a tone arm; and
(e) a setting lever mounted to be rotatable by said turntable and said turntable support member, said setting lever rotating said tone arm to a position above said turntable when said setting lever is rotated by said turntable and said turntable support member,
wherein said turntable support member is moved from said record disc changing position to said play position when said turntable is positioned on said turntable support member, said setting lever is rotated first by said turntable and then by said turntable support member so that said setting lever rotates said tone arm to said position above said turntable.

15. A bookshelf type record player comprising:
(a) a player cabinet;
(b) a turntable support member mounted in said player cabinet to be movable between a play position and a record disc changing position, said record disc changing position being located further from a rear side of said cabinet than said play position;
(c) a turntable detachable from and attachable to said turntable support member;
(d) a tone arm;
(e) a setting lever adapted to be rotated by said turntable and said turntable support member to rotate said tone arm to a position above said turntable when said setting lever is so rotated; and
(f) a driving mechanism for separating said setting lever from said turntable when said setting lever is rotated by said turntable support member,
wherein as said turntable support member is moved from said record disc changing position to said play position while said turntable is positioned on said turntable support member, said turntable engages said setting lever and initially rotates said setting lever until said driving mechanism causes said turntable support member to engage said setting lever and further rotates said setting lever away from said turntable, rotation of said setting lever causing said tone arm to rotate to said position above said turntable.

16. A bookshelf type record player comprising:
(a) a player cabinet;
(b) a turntable support member mounted in said cabinet to be movable between a play position and a record disc changing position, said record disc changing position being located further from a rear side of said cabinet than said play position;
(c) a turntable;
(d) a tone arm; and
(e) a setting lever having at one end an abutting portion for abutting against said turntable, at an intermediate portion a locking projection, and at the other end, means for rotating said tone arm,
wherein as said turntable support member is moved from said record disc changing position to said play position said abutting portion initially is engaged with said turntable thereby causing said setting lever to rotate a predetermined distance, and thereafter said locking projection is engaged with an associated projection formed on said turntable support member to thereby further rotate said setting lever and to separate said abutting portion from said turntable.

17. A bookshelf type record player comprising:
a player cabinet having closed upper, side and rear surfaces;
a motor slide plate slidably mounted in said cabinet to slide between retracted, play and record disc changing positions, in said retracted position, said slide plate being fully received within said cabinet;
a phonomotor secured to said slide plate;
a turntable attachable to and detachable from a shaft of said phonometer;
a D.C. motor fixed to said cabinet at a rear position thereof;
gear reduction means operatively coupled to said D.C. motor;
a crank mechanism operatively coupling said gear reduction means to said slide plate, wherein operation of said D.C. motor slides said slide plate in or out of said cabinet in dependence upon the direction of rotation of said D.C. motor;
first and second limit switches mounted on said player cabinet adjacent said slide plate;
an actuating strip mounted on said slide plate wherein said actuating strip contacts a respective one of said first and second limit switches at positions corresponding to said retracted position and said disc changing position of said slide plate;
a setting lever rotatably supported on a bottom plate of said player cabinet, said setting lever having a roller at one end thereof adapted to contact said turntable when said turntable is positioned on said shaft of said phonomotor, a locking projection being provided at an intermediate portion of said setting lever, said locking projection adapted to contact an associated projection formed on said motor slide plate;
a slide lever slidably mounted on said bottom of said player cabinet at a position to a side of said slide plate, said slide lever being slidable parallel to a direction of sliding of said slide plate, a spring being provided for urging said slide lever to move rearwardly towards a rear side of said cabinet;
a tone arm mounted on said slide plate at such a position that said tone arm normally extends substantially parallel to said rear side of said cabinet when not in a play mode;

a third limit switch operatively positioned to be actuated by said tone arm when said tone arm is at a position above a record disc;

a U-shaped click member adapted for selectively engaging a tone arm rotating pin which is coupled to rotate with said tone arm, said U-shaped click member being pivotally coupled to said slide lever so as to confront a cutaway portion of said slide lever at a rear end of said slide lever, said U-shaped click member being biased in a click manner by a spring;

a tone arm rotating arm secured to a vertical shaft of said tone arm for rotation with said tone arm, said tone arm rotating pin being selectively engaged with said U-shaped click member;

a tone arm elevation lever rotatably supported at a center portion thereof to said bottom plate of said cabinet on a side of said slide lever opposite said slide plate, said tone arm elevation lever being movable up and down;

an arm lifter having an arcuate arm supporting member provided adjacent said vertical shaft of said tone arm and being coupled to said tone arm elevation lever; and a fourth limit switch provided adjacent said tone arm elevation lever wherein, when said tone arm elevation lever is rotated in a counterclockwise direction with said tone arm in a lower position, said fourth limit switch is actuated by said tone arm elevation lever.

18. The record player of claim 17 further comprising a main switch for operating said D.C. motor, said main switch being a push-push type switch and being operatively coupled to said D.C. motor so that the direction of current supplied to said D.C. motor is reversed for each push of said main switch.

19. The record player of claim 17 wherein said first limit switch is a single pole-single throw switch, said second limit switch is a single pole-single throw switch, said third limit switch is a single pole-double throw switch, said fourth limit switch is a single pole-single throw switch, and said main switch is a double pole-double throw switch, pole terminals of said main switch being coupled to said D.C. motor, a first terminal of said fourth limit switch being coupled to a first voltage terminal of a D.C. power source and a second terminal of said fourth limit switch being coupled to a first throw terminal of said main switch corresponding to said first pole, a first throw terminal of said main switch corresponding to said second pole being coupled to a first terminal of said second limit switch and a second terminal of said second limit switch being coupled to ground, a second terminal of said main switch corresponding to said first pole being coupled to a first terminal of said first limit switch, a second terminal of said first limit switch being coupled to a first pole terminal of said third limit switch, a second throw terminal of said main switch corresponding to said second pole being coupled to said second terminal of said fourth limit switch, a pole terminal of said third limit switch being coupled to ground, a second throw terminal of said limit switch being coupled to a first terminal of said phonomotor and a second terminal of said phonomotor being coupled to a second voltage terminal of said power source.

* * * * *